United States Patent
Kihara et al.

(10) Patent No.: US 11,427,082 B2
(45) Date of Patent: Aug. 30, 2022

(54) ACCELERATOR DEVICE

(71) Applicant: DENSO CORPORATION, Kariya (JP)

(72) Inventors: Noriyasu Kihara, Kariya (JP); Yasuhiro Ootaka, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/346,580

(22) Filed: Jun. 14, 2021

(65) Prior Publication Data
US 2021/0300180 A1 Sep. 30, 2021

Related U.S. Application Data

(63) Continuation of application No. PCT/JP2019/039324, filed on Oct. 4, 2019.

(30) Foreign Application Priority Data

Dec. 20, 2018 (JP) .............................. JP2018-237835

(51) Int. Cl.
| | |
|---|---|
| *G05G 1/30* | (2008.04) |
| *B60K 26/02* | (2006.01) |
| *G05G 1/44* | (2008.04) |
| *G05G 5/04* | (2006.01) |

(52) U.S. Cl.
CPC .............. *B60K 26/02* (2013.01); *G05G 1/44* (2013.01); *G05G 5/04* (2013.01)

(58) Field of Classification Search
CPC ............ G05G 1/30; G05G 1/44; G05G 1/445; G05G 5/03; G05G 5/04; B60K 26/02; B60K 26/021
See application file for complete search history.

(56) References Cited

U.S. PATENT DOCUMENTS

| | | | | | |
|---|---|---|---|---|---|
| 5,497,677 | A | * | 3/1996 | Baumann ............... | B60K 26/02 74/513 |
| 5,507,201 | A | * | 4/1996 | Fairbairn ............... | B60K 26/02 74/513 |
| 6,318,208 | B1 | * | 11/2001 | Thongs, Jr ............... | G05G 1/38 74/513 |
| 8,438,945 | B2 | * | 5/2013 | Kim ......................... | G05G 5/03 74/513 |
| 9,323,281 | B2 | * | 4/2016 | Byun ....................... | G05G 5/03 |
| 10,248,152 | B2 | * | 4/2019 | Kim ......................... | G05G 5/05 |

(Continued)

FOREIGN PATENT DOCUMENTS

| | | | |
|---|---|---|---|
| EP | 1777095 | 4/2007 | |
| EP | 3031653 A1 * | 6/2016 | ............... G05G 5/03 |

(Continued)

OTHER PUBLICATIONS

Machine translation of JP 2011-63196 A obtained on Sep. 20, 2021.*

*Primary Examiner* — Adam D Rogers
(74) *Attorney, Agent, or Firm* — Nixon & Vanderhye P.C.

(57) ABSTRACT

An accelerator device includes a pad, a case having an internal accommodation space, an internal movable mechanism, and an arm configured to connect the pad and the internal movable mechanism. When the case is viewed from the side of the pad, a fully open stopper is provided on an outer wall surface of the case at a position in an outer circumference of an area that overlaps with the internal accommodation space.

9 Claims, 14 Drawing Sheets

(56) References Cited

U.S. PATENT DOCUMENTS

| | | | | |
|---|---|---|---|---|
| 10,620,658 | B2 * | 4/2020 | Kadoi | F16H 21/44 |
| 11,077,752 | B2 * | 8/2021 | Kim | B60K 26/02 |
| 2007/0289402 | A1 * | 12/2007 | La | G05G 1/38 |
| | | | | 74/513 |
| 2011/0068608 | A1 | 3/2011 | Ohtsubo et al. | |
| 2011/0277588 | A1 * | 11/2011 | Klimes | B60K 5/08 |
| | | | | 74/594.4 |
| 2015/0033903 | A1 | 2/2015 | Byun et al. | |
| 2021/0284020 | A1 * | 9/2021 | Kita | B60K 26/02 |
| 2021/0294371 | A1 * | 9/2021 | Kihara | G05G 25/04 |
| 2021/0370768 | A1 * | 12/2021 | Kita | B29C 45/26 |
| 2021/0370769 | A1 * | 12/2021 | Kita | B60K 26/02 |

FOREIGN PATENT DOCUMENTS

| | | | | | |
|---|---|---|---|---|---|
| JP | | 08091093 | A * | 4/1996 | |
| JP | | 2011063196 | A * | 3/2011 | |
| WO | WO-2020129377 | A1 * | 6/2020 | | B60K 26/02 |
| WO | WO-2021020236 | A1 * | 2/2021 | | G05G 1/30 |
| WO | WO-2021033718 | A1 * | 2/2021 | | G05G 5/05 |
| WO | WO-2021039657 | A1 * | 3/2021 | | F16F 7/00 |
| WO | WO-2021054191 | A1 * | 3/2021 | | G05G 1/30 |

\* cited by examiner

ACCELERATOR DEVICE

CROSS REFERENCE TO RELATED APPLICATIONS

This application is a continuation application of International Patent Application No. PCT/JP2019/039324 filed on Oct. 4, 2019, which designated the U.S. and based on and claims the benefits of priority of Japanese Patent Application No. 2018-237835 filed on Dec. 20, 2018. The entire disclosure of all of the above applications is incorporated herein by reference.

TECHNICAL FIELD

The present disclosure relates to an accelerator device for a vehicle.

BACKGROUND

An organ structure type accelerator device is known. This accelerator device is fixed to a vehicle body floor of a vehicle interior and detects an amount of an accelerator depression by a driver. A normal accelerator device has a fully open stopper that defines a fully open position of the accelerator.

SUMMARY

According to one embodiment of the present disclosure, an organ structure type accelerator device is provided. The accelerator device includes a pad configured to be stepped on by a driver, a case that can be attached to a vehicle body and has an internal accommodation space, an internal movable mechanism accommodated in the internal accommodation space of the case, and an arm configured to connect the pad and the internal movable mechanism in a state of penetrating an opening provided in the outer wall surface of the case. A full open stopper configured to contact the pad and define a fully open position of an accelerator is provided on an outer wall surface of the case at a position in an outer circumference than area that overlaps with the internal accommodation space.

DETAILED DESCRIPTION

In an assumable example, an organ structure type accelerator device is known. This accelerator device is fixed to a vehicle body floor of a vehicle interior and detects an amount of an accelerator depression by a driver. A normal accelerator device has a fully open stopper that defines a fully open position of the accelerator.

A large load may be applied to the fully open stopper of the accelerator device when the driver mistakenly depresses the brake pedal and the accelerator pedal during sudden acceleration or sudden braking. The above-mentioned conventional technique has a problem that when a large load is applied to the fully open stopper, the accelerator device may be excessively deformed or broken, and normal functions may not be maintained.

According to one embodiment of the present disclosure, an organ structure type accelerator device is provided. The accelerator device includes a pad configured to be stepped on by a driver, a case that can be attached to a vehicle body and has an internal accommodation space, an internal movable mechanism accommodated in the internal accommodation space of the case, and an arm configured to connect the pad and the internal movable mechanism in a state of penetrating an opening provided in the outer wall surface of the case. A full open stopper configured to contact the pad and define a fully open position of an accelerator is provided on an outer wall surface of the case at a position in an outer circumference than area that overlaps with the internal accommodation space.

The outer wall surface of the case at a position in an outer circumference than area that overlaps with the internal accommodation space of the case has higher strength than the outer wall surface at the position of the internal accommodation space. According to the accelerator device, since the fully open stopper is provided in the area having particularly high strength, it is possible to form a structure in which excessive deformation or destruction is unlikely to occur when the accelerator is fully opened.

Figure 1:
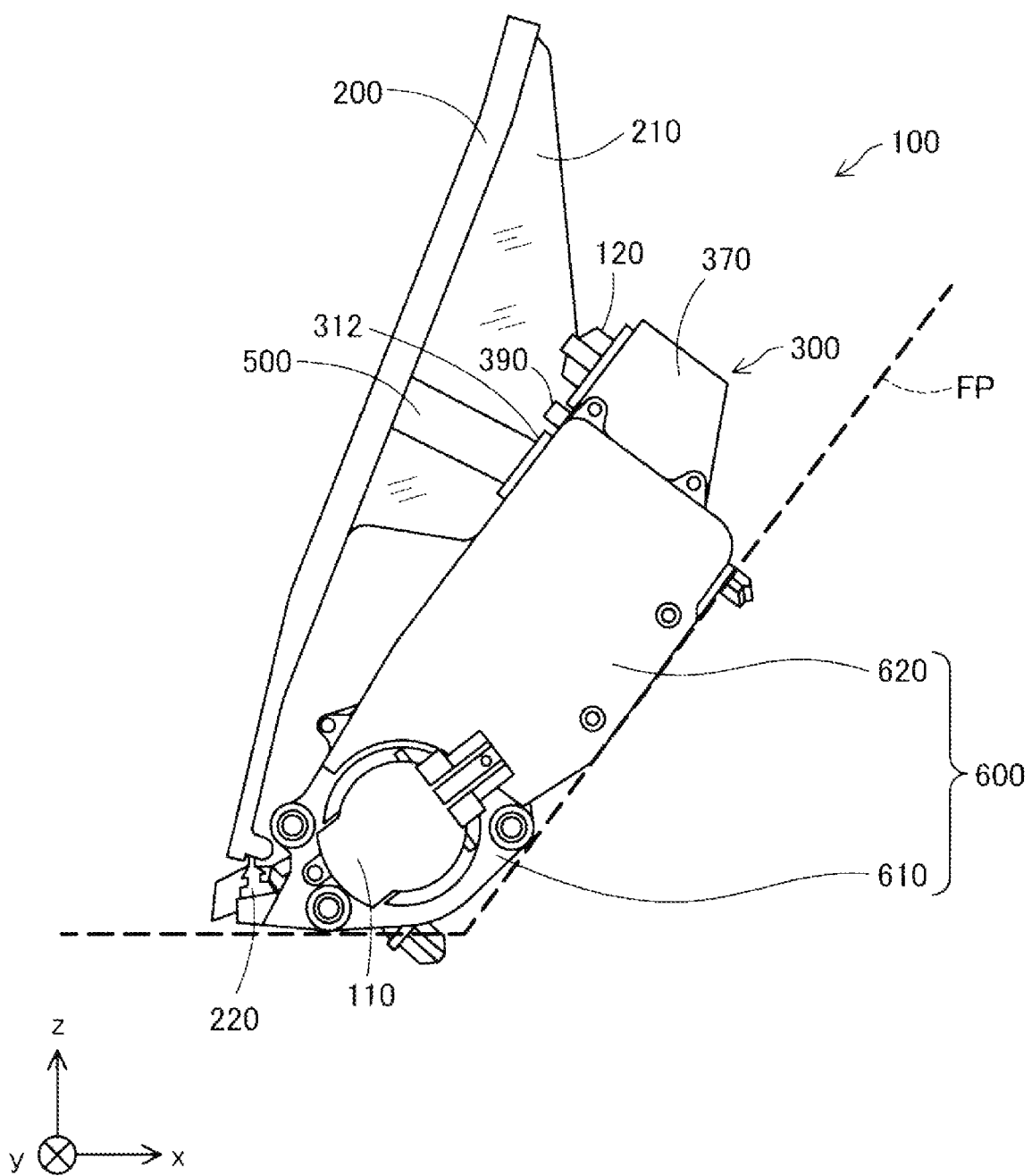
FIG. 1 is a side view of an accelerator device of one embodiment.
Figure 2:
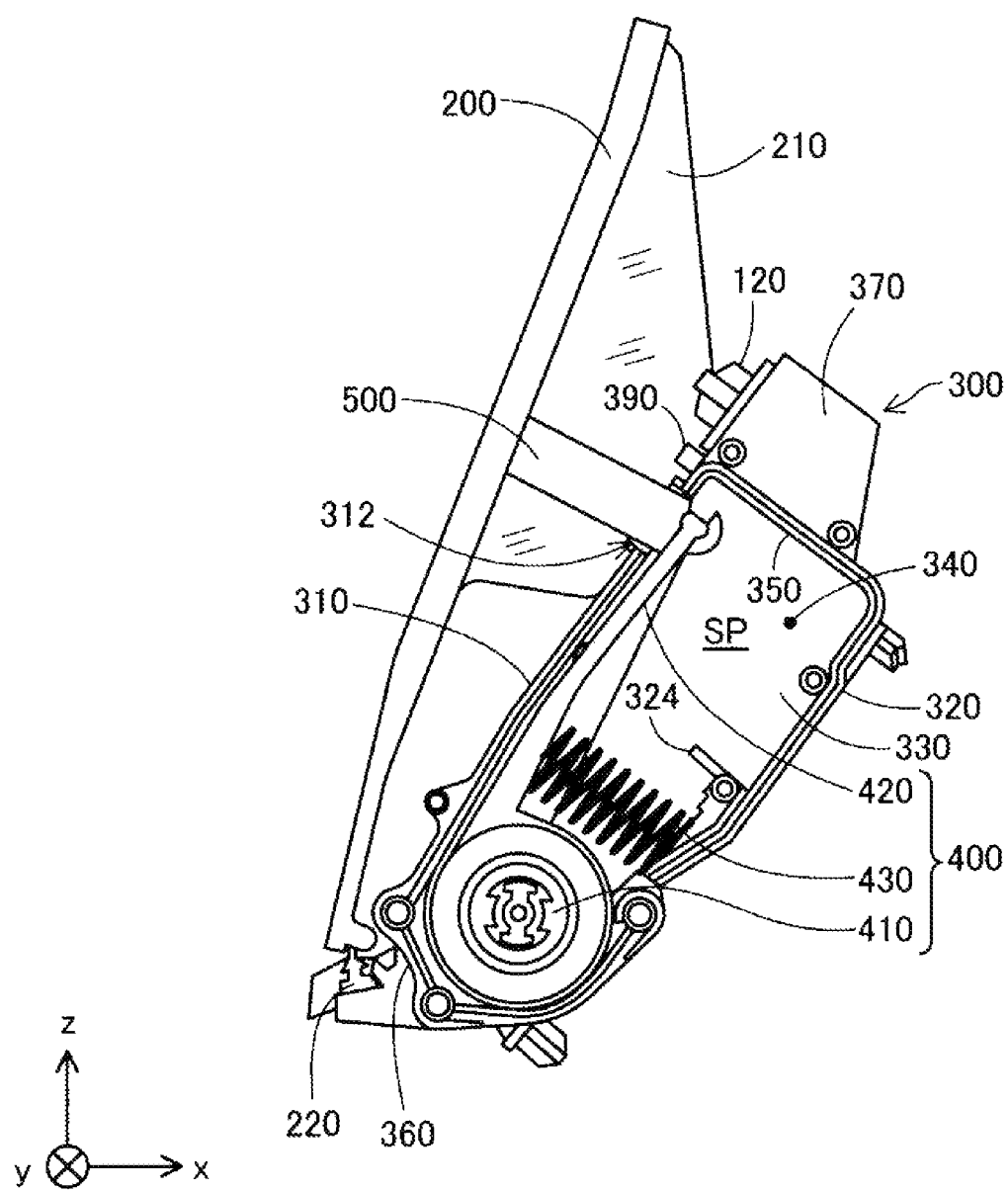
FIG. 2 is a side view of the accelerator device with a cover removed.
Figure 3:
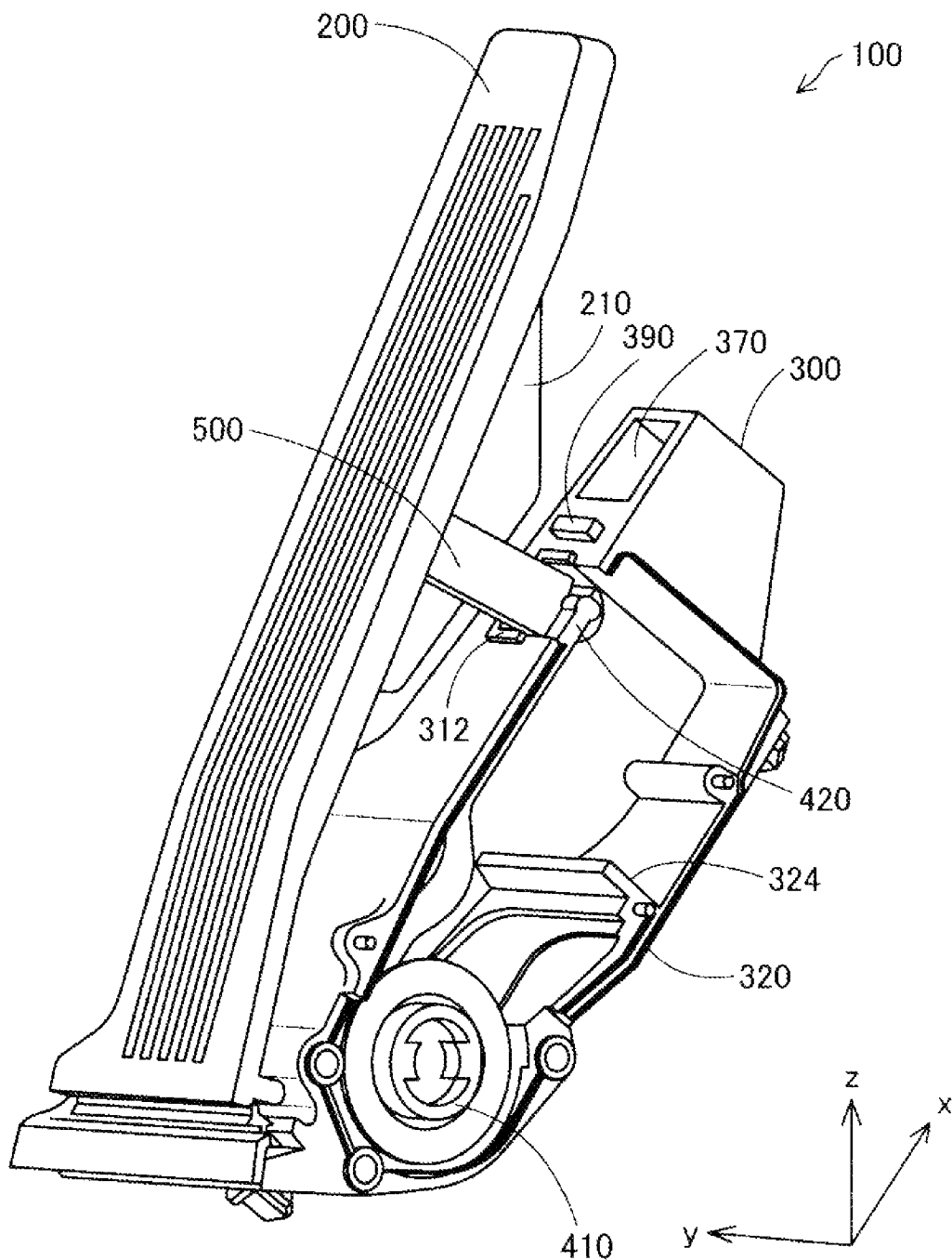
FIG. 3 is a perspective view of the accelerator device with the cover removed.

A. Overall Configuration of Accelerator Device:

As shown in FIGS. 1 to 3, an accelerator device 100 is configured to be attachable to a floor panel FP that constitutes a part of a vehicle body in a vehicle. In FIG. 1, a x-axis direction indicates a traveling direction of the vehicle, a y-axis direction indicates a width direction of the vehicle, and a z-axis direction indicates a vertically upward direction. The directions of the x, y, and z axes in other figures described later also show the same directions as in FIG. 1. Unless otherwise specified, the description of the structure and arrangement of the accelerator device 100 described below means the structure and arrangement in the installed state in which the accelerator device 100 is installed on the vehicle body. For example, the terms "upward" and "upper side" mean upward and upper side in an installed state in which the accelerator device 100 is installed on the vehicle body. The same applies to other terms and explanations.

The accelerator device 100 includes a pad 200 configured to be stepped on by a driver, a case 300 that can be attached to a vehicle body, an internal movable mechanism 400 housed in the case 300, and an arm 500 configured to connect the pad 200 and the internal movable mechanism 400 while penetrating an opening 312 provided on an outer wall surface of the case 300. The opening 312 can also be referred to as a "through hole 312". As described above, the accelerator device 100 having a structure in which the pad 200 provided on the driver side of the case 300 and the internal movable mechanism 400 housed in the case 300 are connected by the arm 500 is called an "organ structure type" accelerator device.

The pad 200 is configured to be stepped on by the driver, and a plate-shaped side guard portion 210 is provided on a side surface of the pad 200. A lower end of the pad 200 is supported by a fulcrum member 220 provided at a lower end of the case 300, and the pad 200 is rotatable about a contact point with the fulcrum member 220. The side guard portion 210 is a member that guards a gap between the pad 200 and the case 300 so that the driver's foot is not pressed between the pad 200 and the case 300.

As shown in FIG. 2, the case 300 is a accommodation wall surrounding an internal accommodation space SP, and includes a front wall 310 facing the pad 200, a back wall 320 facing the front wall 310, an open side surface 330 forming one side surface between the front wall 310 and the back wall 320, a side wall 340 facing the open side surface 330, an upper surface wall 350 defining an upper end of the internal accommodation space SP, and a lower surface wall 360 facing the upper surface wall 350. Strictly speaking, since the open side surface 330 is not a wall surface, the walls 310, 320, 340 to 360 other than the open side surface 330 function as accommodation walls surrounding the internal accommodation space SP. As shown in FIG. 1, the open side surface 330 is covered and closed by a cover 600 composed of a first cover portion 610 and a second cover portion 620. In the present embodiment, the first cover portion 610 and the second cover portion 620 are configured as separate bodies, but they may be configured as one.

An opening 312 through which the arm 500 passes and a fully open stopper 390 are provided on the outer wall surface of the case 300 facing the pad 200. The fully open stopper 390 is a member that regulates an accelerator fully open position by coming into contact with the pad 200 when the pad 200 is fully depressed. The accelerator fully open position is a position set so that the accelerator opening degree becomes 100%. The position and structure of the fully open stopper 390 will be described later.

A kickdown switch 120 is installed on the outer wall surface of the case 300 above the fully open stopper 390. The kickdown switch 120 is a switch for detecting "kickdown", which is an operation in which the driver shifts down the gear at once by strongly depressing the pad 200. An accommodation chamber 370 for accommodating the kickdown switch 120 is formed at an uppermost portion of the case 300. FIG. 3 shows a state in which the kickdown switch 120 is removed from the accommodation chamber 370.

As shown in FIG. 2, a plate-shaped screen portion 324 extending diagonally upward from the back wall 320 toward the front wall 310 is provided on an inner surface of the back wall 320 of the case 300. The screen portion 324 guides the water to a path avoiding an installation position of an urging member 430 so that the water entering from the opening 312 of the case 300 does not directly reach the urging member 430 when it falls in the vertical direction.

As shown in FIG. 2, the internal movable mechanism 400 includes a shaft 410 rotatably supported by the case 300, a pedal 420 extending diagonally upward from the outer peripheral portion of the shaft 410, and the urging member 430 that is housed below the pedal 420 and applies force to the pedal in the direction in which the accelerator is in a fully closed state. As shown in FIG. 1, the first cover portion 610 covers a lower portion of the open side surface 330 of the case 300, which corresponds to the side surface portion of the shaft 410. The second cover portion 620 covers an upper portion of the open side surface 330 above the first cover portion 610.

As shown in FIG. 1, an accelerator opening sensor 110 that generates an accelerator opening signal according to a rotation angle of the shaft 410 is provided on the outside of the shaft 410. In the present embodiment, the accelerator opening sensor 110 includes a detection circuit including a Hall element that detects an orientation of a permanent magnet embedded in the shaft 410. However, it is also possible to use various types of accelerator opening sensors other than the above-described sensor.

Figure 4:
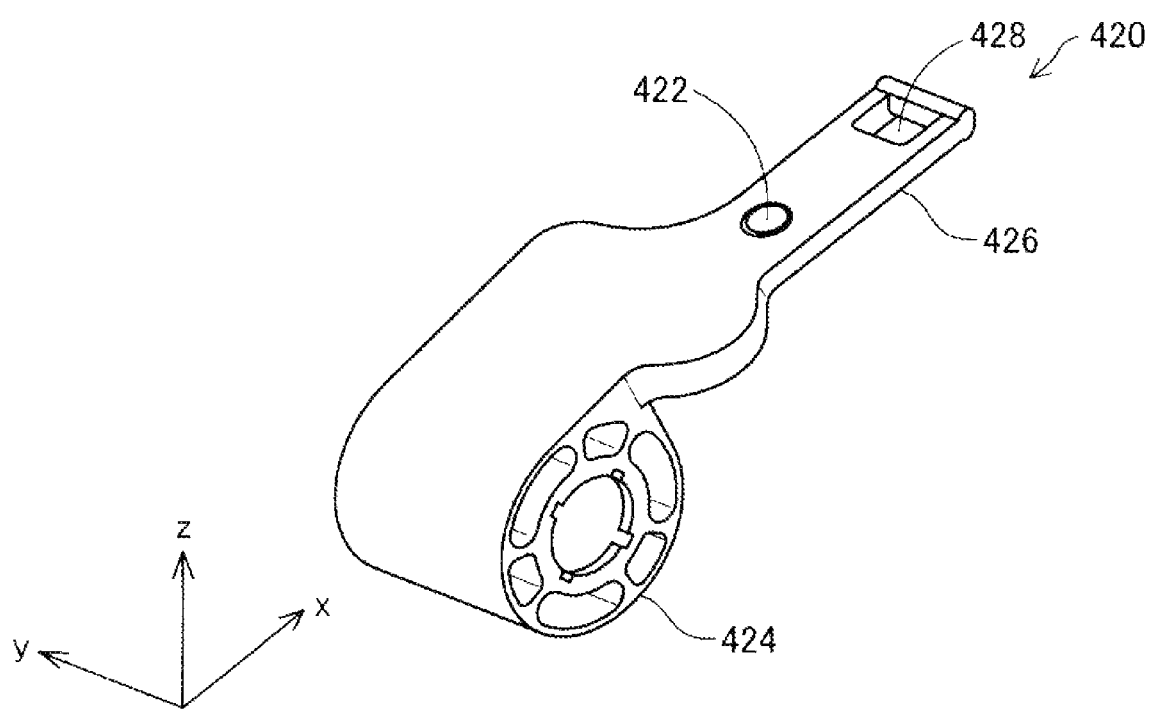
FIG. 4 is a perspective view of a pedal.

As shown in FIG. 4, the pedal 420 has a cylinder portion 424 into which the shaft 410 is inserted, and a pedal extension portion 426 extending obliquely upward from the cylinder portion 424. A branch point between the pedal extension portion 426 and the cylinder portion 424 is also referred to as the "root of the pedal 420". An engagement hole 428 that engages with a tip portion of the arm 500 is provided near the tip of the pedal extension portion 426. A fully closed stopper 422 is provided on an upper surface of the pedal extension portion 426 so as to project from the upper surface of the pedal extension portion 426. The fully closed stopper 422 is a member that regulates the fully closed position of the accelerator by coming into contact with an inner surface of the front wall 310 of the case 300.

Figure 5:
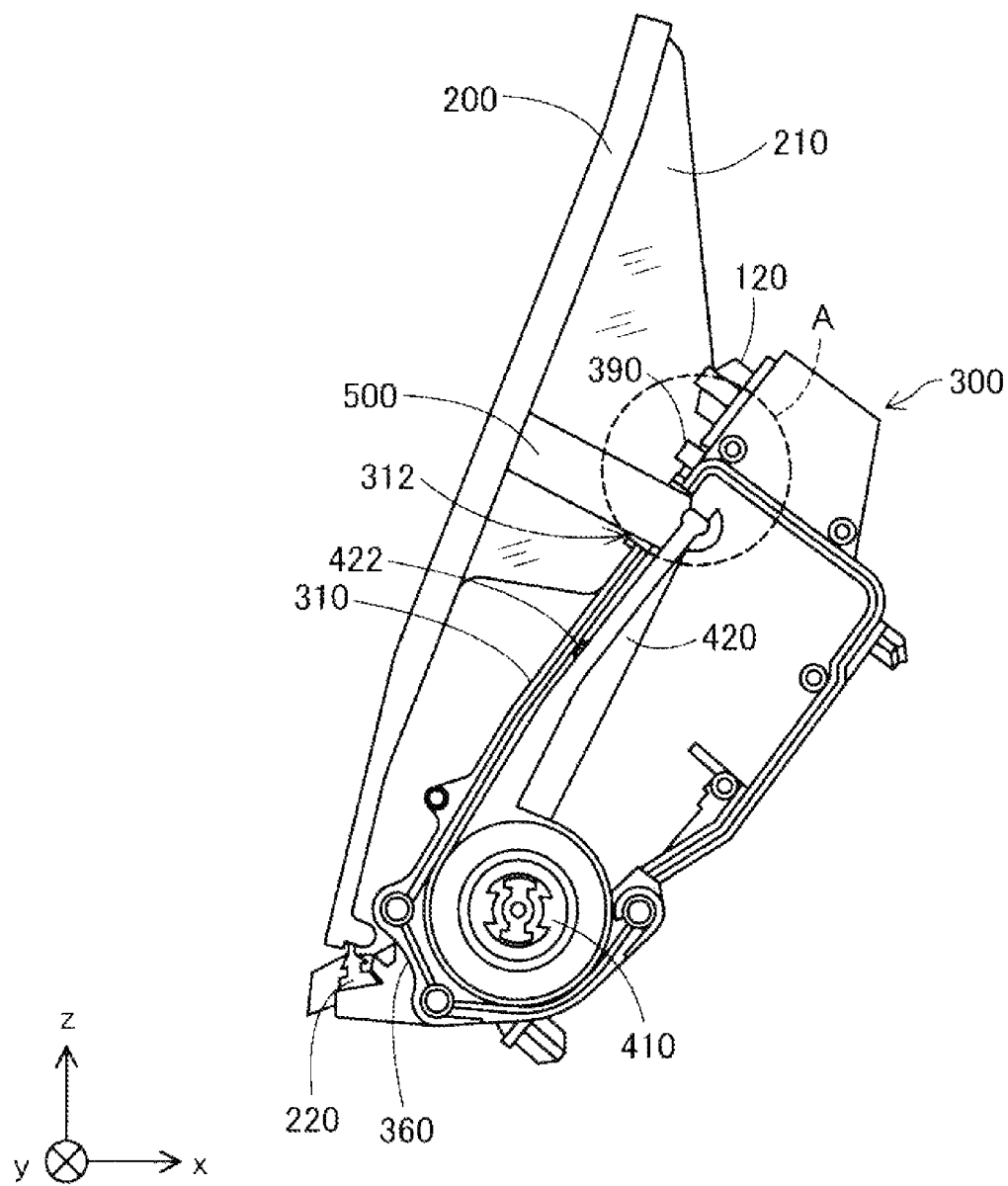
FIG. 5 is a side view showing a fully closed state of an accelerator.
Figure 6:
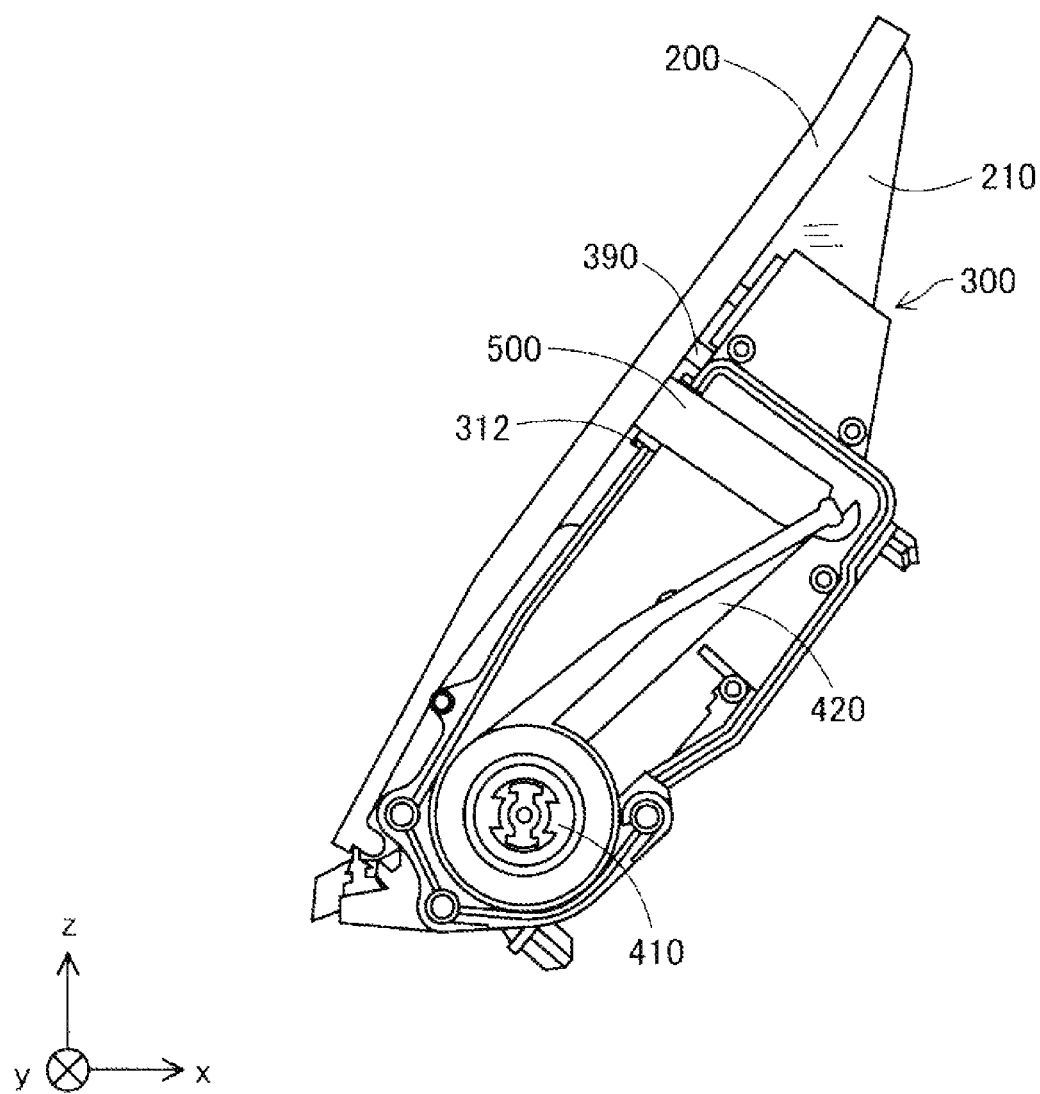
FIG. 6 is a side view showing a fully open state of the accelerator.

As shown in FIG. 5, in the fully closed state of the accelerator, the fully closed stopper 422 of the pedal 420 comes into contact with the inner surface of the front wall 310 of the case 300. As shown in FIG. 6, in the fully open state of the accelerator, the fully open stopper 390 provided on an outer surface of the front wall 310 of the case 300 comes into contact with the pad 200.

Figure 7:
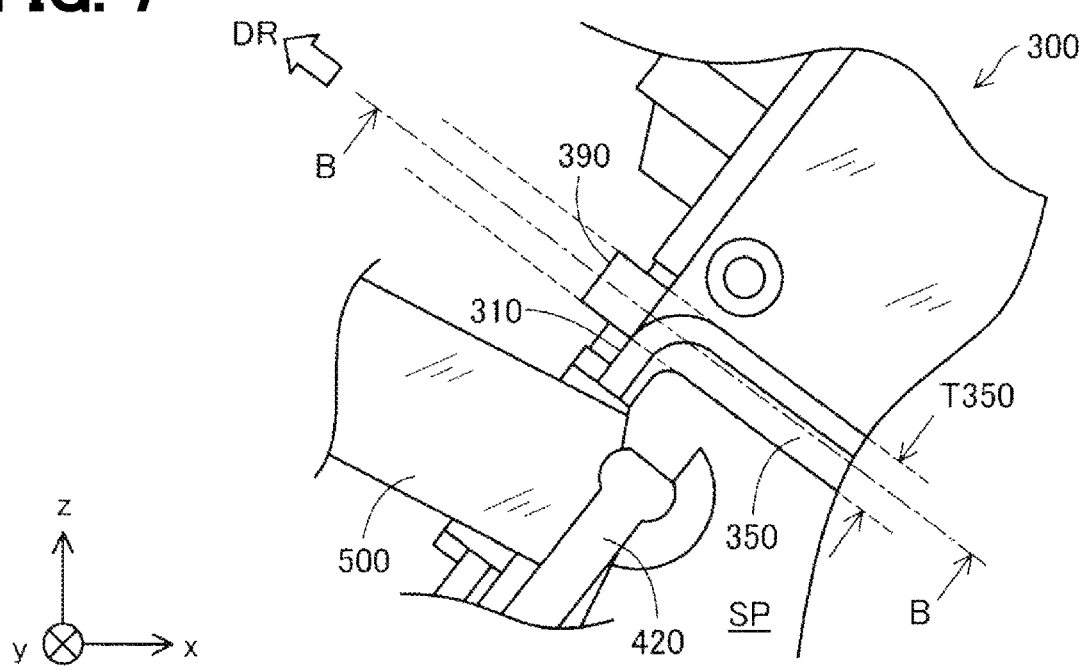
FIG. 7 is an enlarged view of part A in FIG. 5.

As shown in FIG. 7, the fully open stopper 390 is attached at a position on the outer wall surface of the case 300 that intersects the outer wall surface of the case 300 when the upper surface wall 350 is extended along a direction DR orthogonal to a direction of a plate thickness T350 of the upper surface wall 350. Since this position has particularly high strength in the outer wall surface of the case 300, when the fully open stopper 390 is provided here, it is possible to form a structure in which excessive deformation or destruction is unlikely to occur when the accelerator is fully opened. However, the fully open stopper 390 may be provided at a position other than this position. Even in that case, when the case 300 is viewed from the pad 200 side, the fully open stopper 390 is not located in an area that overlaps with the internal accommodation space SP of the case 300, but it is preferably provided on the outer wall surface of the case 300 at a position on the outer peripheral side of the range overlapping the internal accommodation space SP. The reason for the above mentioned configuration is that the outer wall surface in the range corresponding to the internal accommodation space SP has a slightly lower strength, and the outer wall surface of the case 300 at the position on the outer peripheral side has a higher strength than the above mentioned range. As such a "position on the outer wall surface of the case 300 at a position in the outer circumference of the area that overlaps with the internal accommodation space SP", for example, the periphery of the kickdown switch 120 can be selected. Since the periphery of the kickdown switch 120 is a wall surface surrounding the accommodation chamber 370 of the kickdown switch 120, the strength is relatively high, and the position where the fully open stopper 390 is provided is also preferable.

In the constituent elements of the accelerator device 100, the elements other than the shaft 410 and the urging member 430 can be formed of resin. The overall configuration of the accelerator device 100 described above is an example, and a part thereof can be arbitrarily omitted. For example, the side guard portion 210 and the screen portion 324 may be omitted.

Figure 8A:
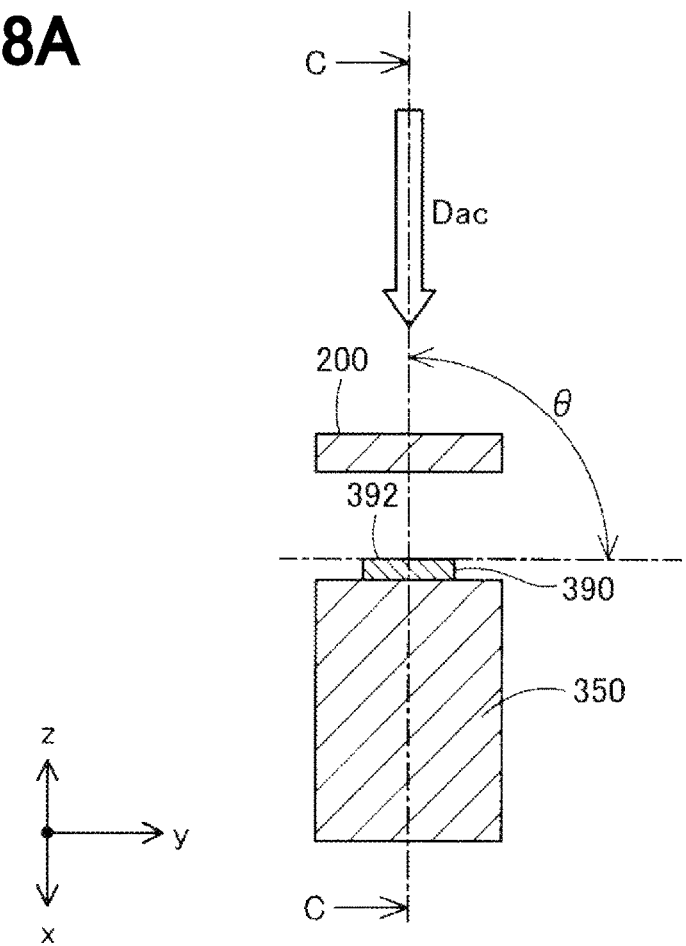
FIG. 8A is a diagram showing a first structural example of a fully open stopper as seen in a cross section taken along a line B-B of FIG. 7.
Figure 8B:
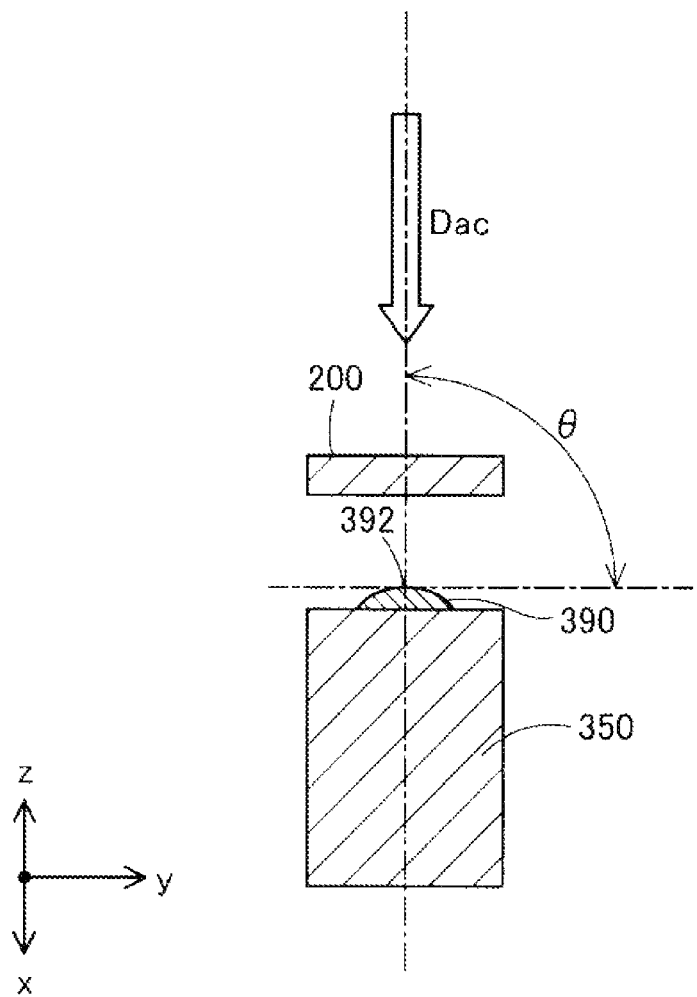
FIG. 8B is a diagram showing a second structural example of the fully open stopper as seen in the cross section taken along the line B-B of FIG. 7.

B. Structural Example of a Fully Open Stopper as Seen in the Cross Section Taken Along a Line B-B of FIG. 7:

FIGS. 8A to 8B show structural examples of the fully open stopper as seen in the cross section taken along a line B-B of FIG. 7. As shown in FIG. 8A, the fully open stopper 390 is provided above the upper surface wall 350 of the case 300. The fully open stopper 390 is integrally molded with the same material as the case 300, but in the example of FIG. 8A, different hatching is attached to the fully open stopper 390 and the upper surface wall 350 of the case 300 for convenience of illustration. This point is the same in the following figures.

The fully open stopper 390 has a contact surface 392 in contact with the pad 200. In the first structural example shown in FIG. 8A, the contact surface 392 is a plane substantially perpendicular to a stepping direction Dac of the pad 200. Specifically, an angle θ formed by the stepping direction Dac of the pad 200 and the contact surface 392 is preferably in the range of 90 degrees±5 degrees, and more preferably in the range of 90 degrees±3 degrees. In this way, the driver's stepping load can be efficiently received, so that deformation and destruction can be less likely to occur.

In the second structural example shown in FIG. 8B, the entire fully open stopper 390 has a shape including a curved surface, but the contact surface 392 in contact with the pad 200 is a plane substantially perpendicular to the stepping direction Dac of the pad 200.

B. Structural Example of a Fully Open Stopper as Seen in the Cross Section Taken Along a Line C-C of FIG. 8A:

FIGS. 9A to 9E show various structural examples of the fully open stopper 390 as seen in the cross section taken along a line C-C of FIG. 8A. These examples correspond to the cross sections of the fully open stopper 390 viewed from the same direction as in FIG. 7.

Figure 9A:
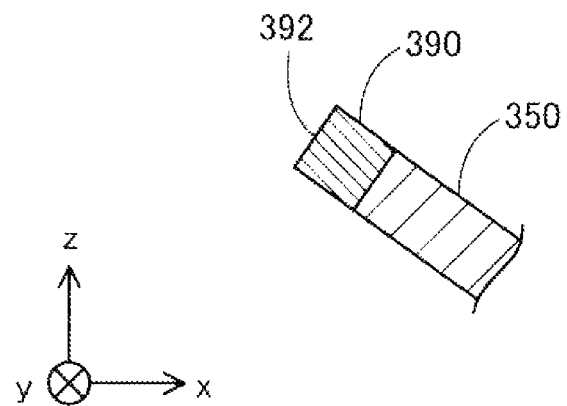
FIG. 9A is a diagram showing a first structural example of the fully open stopper as seen in the cross section taken along a line C-C of FIG. 8A.
Figure 9B:
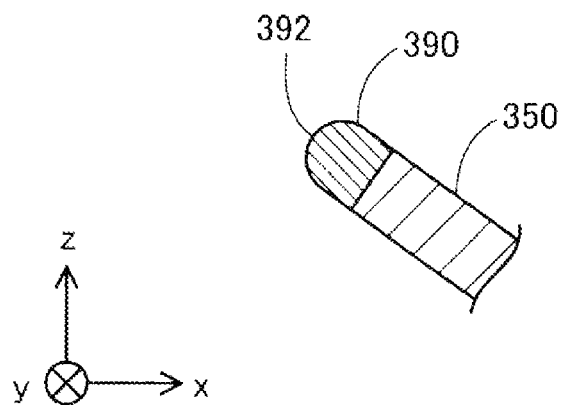
FIG. 9B is a diagram showing a second structural example of the fully open stopper as seen in the cross section taken along a line C-C of FIG. 8A.
Figure 9C:
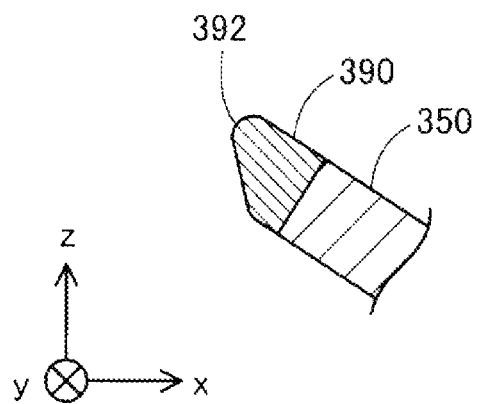
FIG. 9C is a diagram showing a third structural example of the fully open stopper as seen in the cross section taken along a line C-C of FIG. 8A.
Figure 9D:
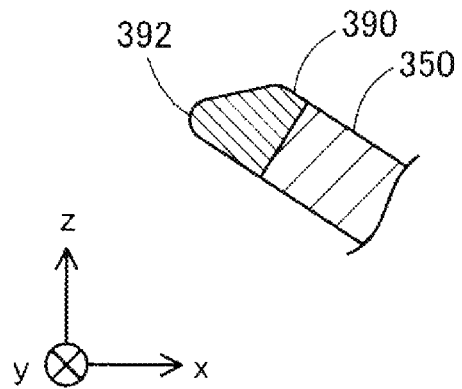
FIG. 9D is a diagram showing a fourth structural example of the fully open stopper as seen in the cross section taken along a line C-C of FIG. 8A.
Figure 9E:
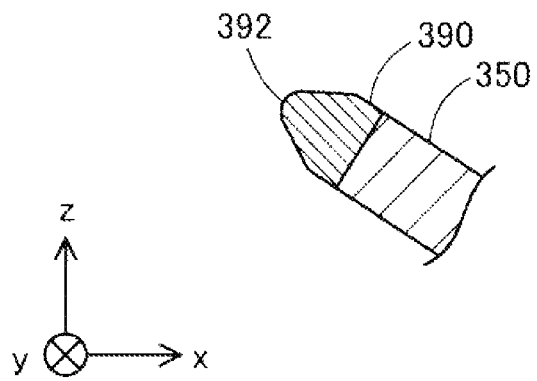
FIG. 9E is a diagram showing a fifth structural example of the fully open stopper as seen in the cross section taken along a line C-C of FIG. 8A.

In the first structural example of FIG. 9A, the contact surface 392 of the fully open stopper 390 is flat shape. The contact surface 382 is a plane substantially perpendicular to the stepping direction of the pad 200. In the second structural example of FIG. 9B, the contact surface 392 of the fully open stopper 390 has an R-shaped portion. The R-shaped portion means a shape having a substantially arcuate cross section. In the third structural example of FIG. 9C, the contact surface 392 of the fully open stopper 390 has a flat inclined portion on the upper side of the portion in contact with the pad 200. In the fourth structural example of FIG. 9D, the contact surface 392 of the fully open stopper 390 has a flat inclined portion below the portion in contact with the pad 200. In the fifth structural example of FIG. 9E, the contact surface 392 of the fully open stopper 390 has flat inclined portions on both sides of the portion in contact with the pad 200. In the three structural examples of FIGS. 9C to 9E, the contact portion of the contact surface 392 that contacts the pad 200 is a curved surface, and the contact portion and the flat inclined portion are continuously formed by a smooth curved surface. As shown in FIGS. 9B to 9E, if the fully open stopper 390 is configured so that the contact surface 392 has an inclined portion or an R-shaped portion, the structure is such that foreign matter falling from the surroundings in the vicinity of the fully open stopper 390 is likely to collect on the contact surface 392.

D. Structural Example of the Fully Open Stopper Seen from the Direction Orthogonal to the Plate Thickness Direction of the Upper Surface Wall:

FIGS. 10A to 10D show the structural examples of the fully open stopper 390 viewed from a direction orthogonal to the direction of the plate thickness T350 of the upper surface wall 350. The fully open stopper 390 has an upper side surface 394 that constitutes an upper surface of the fully open stopper 390 when viewed from the side of the pad 200.

Figure 10A:
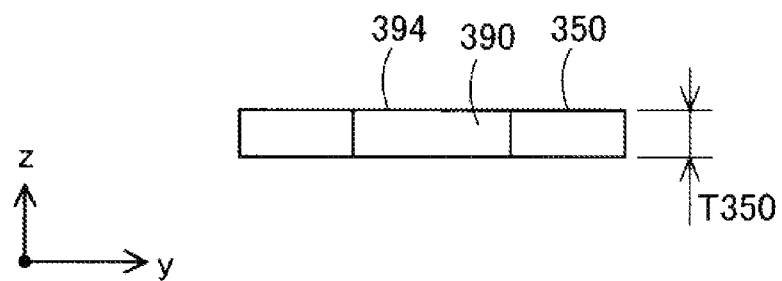
FIG. 10A is a diagram showing a first structural example of the fully open stopper viewed from a direction orthogonal to a plate thickness direction of an upper surface wall.
Figure 10B:
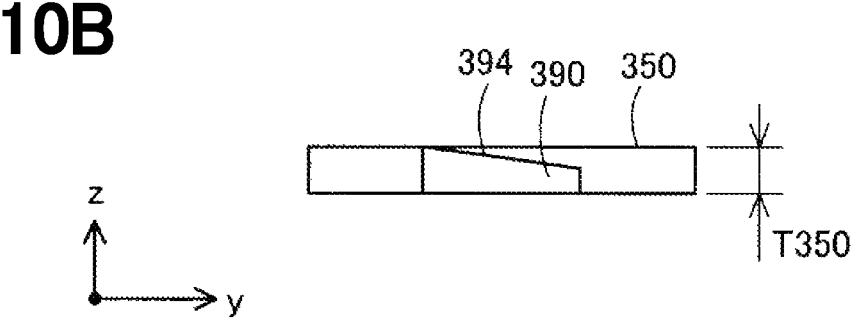
FIG. 10B is a diagram showing a second structural example of the fully open stopper seen from a direction orthogonal to the plate thickness direction of the upper surface wall.
Figure 10C:
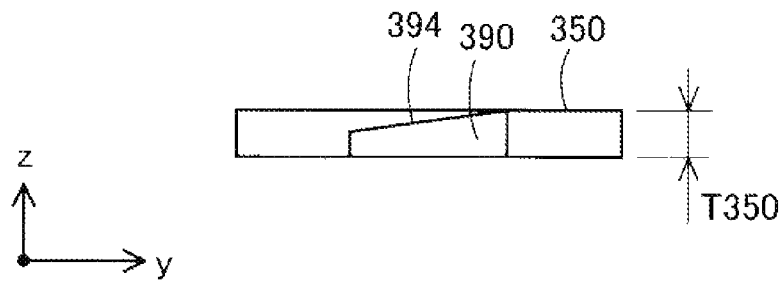
FIG. 10C is a diagram showing a third structural example of the fully open stopper seen from a direction orthogonal to the plate thickness direction of the upper surface wall.
Figure 10D:
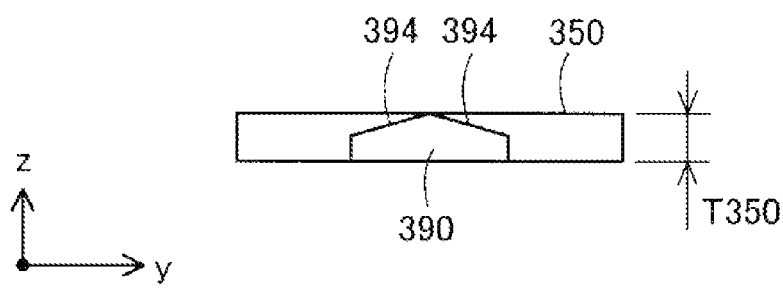
FIG. 10D is a diagram showing a fourth structural example of the fully open stopper seen from a direction orthogonal to the plate thickness direction of the upper surface wall.

In the first structural example shown in FIG. 10A, the upper side surface 394 of the fully open stopper 390 is flat. In the second structural example shown in FIG. 10B, the upper side surface 394 of the fully open stopper 390 has an inclined portion inclined to a right side. In the third structural example shown in FIG. 10C, the upper side surface 394 of the fully open stopper 390 has an inclined portion inclined to a left side. In the fourth structural example shown in FIG. 10D, the upper side surface 394 of the fully open stopper 390 has both a first inclined portion inclined to the right side and a second inclined portion inclined to the left side. Instead of the inclined portion, the upper side surface 394 of the fully open stopper 390 may be configured so as to have an R-shaped portion. If the fully open stopper 390 is configured so that the upper side surface 394 has an inclined portion or an R-shaped portion, foreign matter falling from the surroundings in the vicinity of the fully open stopper 390 is unlikely to collect on the upper side of the fully open stopper 390. The structure can be such that foreign matter does not easily collect on the contact surface 392.

Figure 11:
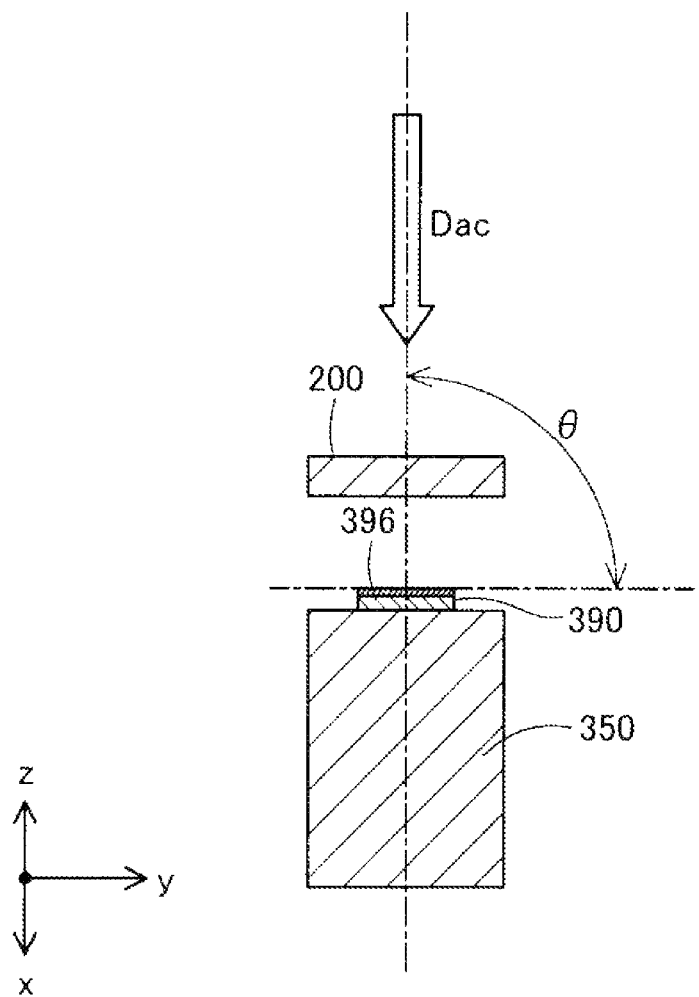
FIG. 11 is a diagram showing a structural example of a fully open stopper provided with an elastic member on a contact surface.

E. Other Structural Examples of Fully Open Stopper:

In the structural example shown in FIG. 11, an elastic member 396 is provided on the contact surface 392 of the fully open stopper 390 shown in FIG. 8A. In this way, the elastic member 396 can absorb the impact force and reduce the generation of abnormal noise.

Figure 12A:
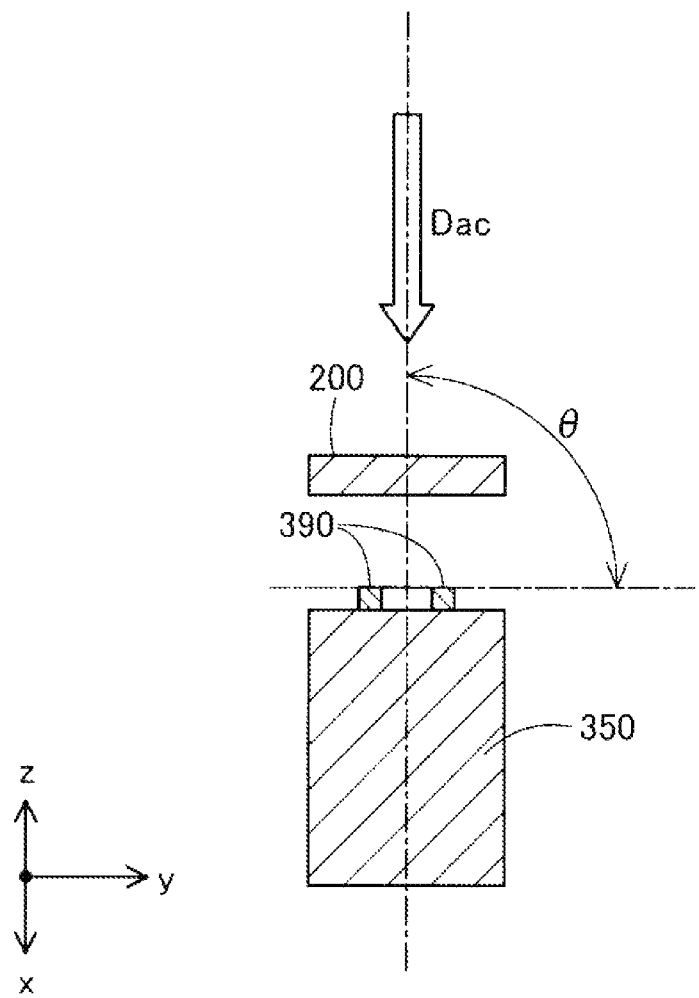
FIG. 12A is a diagram showing a first structural example of a fully open stopper having a plurality of contact surfaces.
Figure 12B:
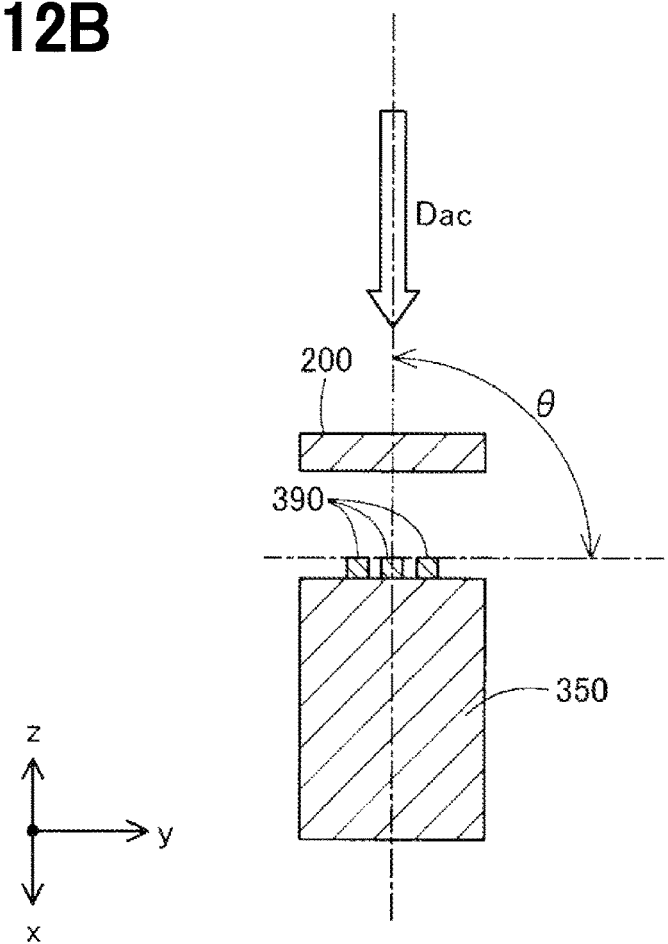
FIG. 12B is a diagram showing a second structural example of a fully open stopper having a plurality of contact surfaces.

In the structural example shown in FIGS. 12A and 12B, a plurality of fully open stoppers 390 are provided instead of the one fully open stopper 390 shown in FIG. 8A. In the example of FIG. 12A, two fully open stoppers 390 are provided, and in the example of FIG. 12B, three fully open stoppers 390 are provided. By providing a plurality of fully open stoppers 390 in this way, the load is dispersed, so that the structure is less likely to be deformed or broken.

Figure 13A:
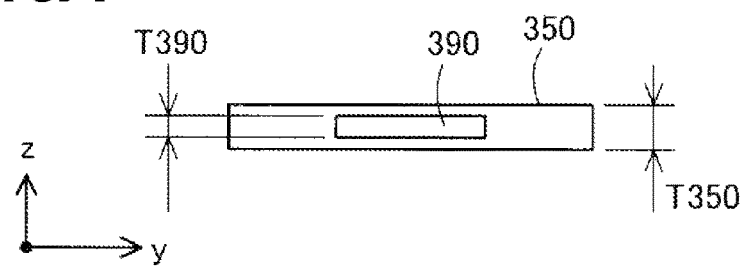
FIG. 13A is a diagram showing a first example of a thickness of the fully open stopper and the upper surface wall.
Figure 13B:
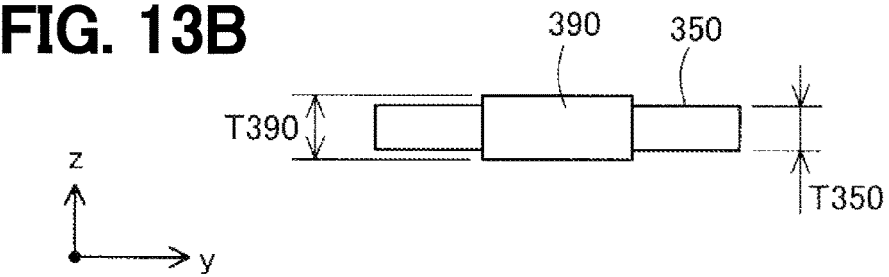
FIG. 13B is a diagram showing a second example of the thickness of the fully open stopper and the upper surface wall.

FIGS. 13A and 13B show an example of the thickness of the fully open stopper 390 and the upper surface wall 350. In the example of FIG. 13A, a thickness T390 of the fully open stopper 390 is smaller than the thickness T350 of the upper surface wall 350. In the example of FIG. 13B, the thickness T390 of the fully open stopper 390 is larger than the thickness T350 of the upper surface wall 350. As shown in FIG. 10A described above, the fully open stopper 390 and the upper surface wall 350 may have the same thickness.

It should be noted that the various structural examples described above can be arbitrarily adopted independently of each other, and can also be adopted in any combination thereof.

The present disclosure should not be limited to the embodiments described above, and various other embodiments may be implemented without departing from the scope of the present disclosure. In order to solve some or all of the above problems, or to achieve some or all of the above effects, the technical features in the embodiments can be replaced or combined as appropriate. Also, if the technical features are not described as essential in the present specification, they can be deleted as appropriate.

What is claimed is:

1. An accelerator device that is an organ structure type, comprising:
    a pad configured to be stepped on by a driver;
    a case configured to be attached to a vehicle body and having an internal accommodation space;
    an internal movable mechanism housed in the internal accommodation space of the case;
    an arm configured to connect the pad and the internal movable mechanism while penetrating an opening provided on an outer wall surface of the case; and
    a fully open stopper configured to contact the pad and define a fully open position of the accelerator device, and the fully open stopper being provided on the outer wall surface of the case at a position in an outer circumference of an area that overlaps with the internal accommodation space;
    wherein a side surface of the fully open stopper as viewed from a direction orthogonal to a direction of a plate thickness of an upper surface wall defining an upper end of the internal accommodation space is at a same position with respect to an end surface of the upper surface wall or at a position facing the direction of the plate thickness.

2. The accelerator device according to claim 1, wherein
    the case has an accommodation wall that surrounds the internal accommodation space,
    the accommodation wall includes the upper surface wall that defines the upper end of the internal accommodation space, and
    the fully open stopper is provided at a position on the outer wall surface of the case that intersects the outer wall surface of the case when the upper surface wall is extended along the direction orthogonal to the direction of the plate thickness of the upper surface wall.

3. The accelerator device according to claim 1, wherein
    a contact surface of the fully open stopper in contact with the pad is a plane substantially perpendicular to a stepping direction of the pad.

4. The accelerator device according to claim 1, wherein
    a contact surface of the fully open stopper in contact with the pad has an inclined portion or an R-shaped portion.

5. The accelerator device according to claim 1, wherein
    when the fully open stopper is viewed from a side of the pad, the fully open stopper has an upper side surface forming an upper surface of the fully open stopper, and the upper side surface has an inclined portion inclined to a right side or a left side.

6. The accelerator device according to claim 1, wherein
    an elastic member is provided on a contact surface of the fully open stopper in contact with the pad.

7. The accelerator device according to claim 1, wherein
    the fully open stopper is comprised of a plurality of fully open stoppers.

8. The accelerator device according to claim 1, wherein the side surface is flat and flush with the upper surface wall.

9. An accelerator device that is an organ structure type, comprising:
    a pad configured to be stepped on by a driver;
    a case configured to be attached to a vehicle body and having an internal accommodation space;
    an internal movable mechanism housed in the internal accommodation space of the case;
    an arm configured to connect the pad and the internal movable mechanism while penetrating an opening provided on an outer wall surface of the case; and
    a fully open stopper configured to contact the pad and define a fully open position of the accelerator device, and the fully open stopper being provided on the outer wall surface of the case at a position in an outer circumference of an area that overlaps with the internal accommodation space;
    wherein an elastic member is provided on a contact surface of the fully open stopper in contact with the pad.

* * * * *